United States Patent [19]
Johnson

[11] Patent Number: 5,970,050
[45] Date of Patent: Oct. 19, 1999

[54] ALLOCATING COMMUNICATION TRAFFIC

[75] Inventor: David Johnson, Ipswich, United Kingdom

[73] Assignee: British Telecommunications public limited company, London, United Kingdom

[21] Appl. No.: 08/751,775

[22] Filed: Nov. 15, 1996

[30] Foreign Application Priority Data

Apr. 30, 1996 [GB] United Kingdom .................... 9608816

[51] Int. Cl.⁶ .................................................... H04L 12/56
[52] U.S. Cl. .......................... 370/238; 370/351; 370/400
[58] Field of Search ..................................... 370/231, 232, 370/235, 237, 238, 319, 322, 329, 341, 344, 347, 348, 351, 254, 400, 389, 401; 395/200.69, 200.71

[56] References Cited

U.S. PATENT DOCUMENTS

| 4,707,832 | 11/1987 | Glenn et al. | 370/489 |
| 5,163,042 | 11/1992 | Ochiai | 370/400 |
| 5,317,566 | 5/1994 | Joshi | 370/238 |
| 5,533,016 | 7/1996 | Cook et al. | 370/351 |
| 5,649,108 | 7/1997 | Spiegel et al. | 370/400 |

FOREIGN PATENT DOCUMENTS

A2189111  10/1987  United Kingdom .

OTHER PUBLICATIONS

Gersht et al, "NOM—A Tool For Optimal Design and Performance Evaluation of Routing Strategies and Its Application to the Telenet Network", IEEE INFOCOM '88, New Orleans, Mar. 27–31, 1988, No. 1988, Mar. 27, 1988, Institute of Electrical and Electronics Engineers, pp. 585–592.

Schwartz, Telecommunication Networks, 1987, pp. 175–176.

Primary Examiner—Chau Nguyen
Attorney, Agent, or Firm—Nixon & Vanderhye P.C.

[57] ABSTRACT

Communication traffic is allocated through a network of interconnected nodes. A communication path may be established between terminals via a plurality of routes. Processors are provided for processing parameters for portions of a set of potential routes to determine a notional cost of using each of these routes. An optimal level of traffic is identified for each route portion and a parameter (such as notional route length) is adjusted to make use of the route more costly if the traffic for that portion exceeds the notional value and, in addition, if the traffic for the portion falls below the optimum value, a route is then selected with reference to route cost comparisons.

16 Claims, 8 Drawing Sheets

ALLOCATING COMMUNICATION TRAFFIC

BACKGROUND OF THE INVENTION

1. Field of the Invention

The present invention relates to allocating communication traffic through a network of interconnected nodes.

2. Related Art

In data communications and telecommunications environments, greater demands are being made for dedicated data links. Communication paths may be established between remote sites by a dedicated physical communications channel although, in the majority of circumstances, the provision of such a channel would be prohibitively expensive.

Dedicated communication channels are also provided by effectively sharing resources within a networked environment. A service provider will establish a network of this type and, for each customer, the provider will guarantee a communication path of a specified bandwidth through the network. As new customers subscribe to the service, the number of paths required through the network will increase and further demands may be placed on the network as customer traffic demands also increase. It is therefore to the advantage of the network provider to configure a network which will satisfy all customer demands while at the same time optimise the allocation of hardware within the network itself.

Systems are known in which route selection is made on the basis of notional costs incurred for implementing a particular route from a plurality of possible routes. Costing of this type tends to be made on the basis that it is undesirable for a particular route portion to become saturated, particularly if other regions within the network are being under-utilized. It is therefore known to increase the notional costs of using a particular route (possibly increasing a notional parameter relating to the portion length) as the amount of traffic using the particular portion increases.

However, such an approach assumes that the cost of using a particular route will only increase as traffic usage increases. Thus, an analysis of this type tends to suggest that the most efficient route is one in which no actual traffic is being conveyed at all. This is clearly inconsistent with the practical reality, therefore it can be appreciated that existing models for modifying notional route costs are somewhat flawed.

SUMMARY OF THE INVENTION

According to a first aspect of the present invention, there is provided a method for calculating nominal costs for each of a plurality of possible routes through a communications network from a first node to a second node, said method comprising the steps of: defining a relationship between a range of nominal costs for routes and the traffic density for routes, said relationship being representable by a curve having at least one point of inflection; identifying the traffic density for each of said plurality of possible routes to establish the nominal cost of each said possible route in accordance with said defining step; selecting one of said plurality of possible routes in dependence on the nominal cost of each said possible route as established in said identifying step.

According to a second aspect of the present invention, there is provided apparatus for calculating nominal costs for each of a plurality of possible routes through a communications network from a first node to a second node, said apparatus comprising: means for defining a relationship between a range of nominal costs for routes and the traffic density for routes, said relationship being representable by a curve having at least one point of inflection; means for identifying the traffic density for each of said plurality of possible routes to establish the nominal cost of each said possible route in accordance with said defining means; means for selecting one of said plurality of possible routes in dependence on the nominal cost of each said possible route as established by said identifying means.

According to a third aspect of the present invention, there is provided a method for calculating nominal costs of each of a plurality of possible routes through a communications network from a first node to a second node, said method comprising the steps of: defining a relationship between a range of nominal costs for routes and the traffic density for routes, said relationship being representable by a curve having at least one point of inflection; identifying the traffic density for each of said plurality of possible routes to establish the nominal cost of each said possible route in accordance with said defining step.

According to a fourth aspect of the present invention, there is provided an apparatus for calculating nominal costs of each of a plurality of possible routes through a communications network from a first node to a second node, said apparatus comprising: means for defining a relationship between a range of nominal costs for routes and the traffic density for routes, said relationship being representable by a curve having at least one point of inflection; means for identifying the traffic density for each of said plurality of possible routes to establish the nominal cost of each said possible route in accordance with said defining means.

DETAILED DESCRIPTION OF THE PREFERRED EMBODIMENTS

The invention will now be described by way of example only with reference to the drawings identified previously.

Figure 1:
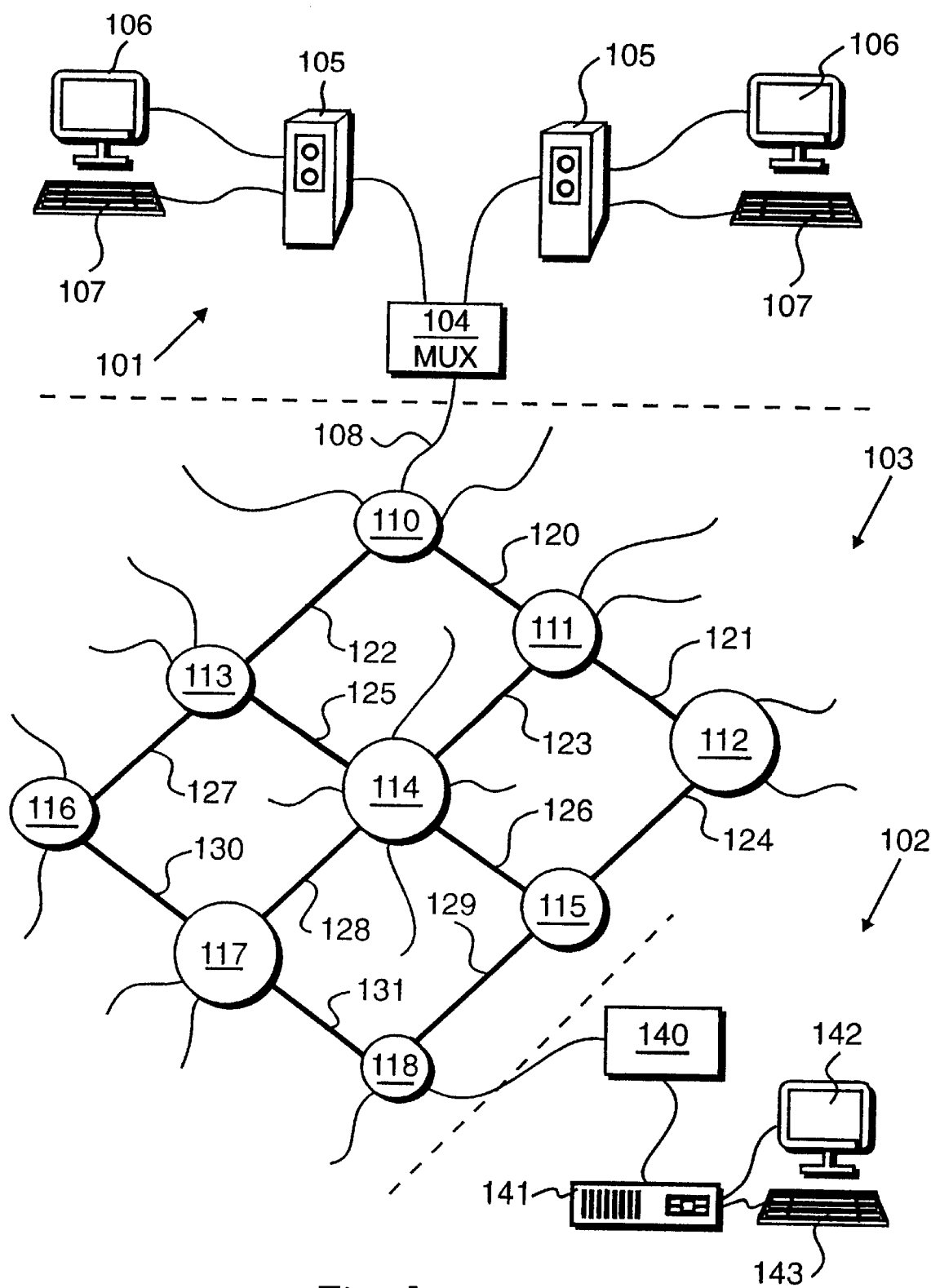
FIG. 1 shows two customer sites interconnected via a distributed network.

A communication environment is shown in FIG. 1 in which a first customer, illustrated generally at 101 communicates with a second customer, illustrated generally at 102, via a communications network 103. A network provider, responsible for the network 103, has guaranteed a communication channel between the first customer 101 to a second customer 102 of a predetermined band width. In this particular network, band width is allocated as digital communication channels capable of conveying 64 kilobits per second. Multiple channels of this type may be allocated to customers, thereby providing them with effectively any degree of band width in multiples of 64 kilobits per second.

Within the network itself, 64 kilobit channels are multiplexed for transmission at 2 megabits per second and again multiple transmission paths may be provided so as to increase transmission band width where required. The network is configured from a plurality of transmission paths, interconnected by a plurality of switching nodes. At each node switching devices are arranged to receive two megabit per second multiplexes, whereupon time switching within the multiplex and space switching to other multiplexes are provided.

The topology of the network is such that it is possible for a plurality of routes to be taken for a particular logical communication channel to be established through the network.

Customer 101 has two processing environments with computers being arranged to transmit and receive data through a multiplexing device 104. Each workstation includes a processing device 105, a visual display unit 106 and a manually operable keyboard 107, in addition to other input/output devices as required. Data from the multiplexing device 104 is supplied over a transmission line 108 to a first node within the network 110. In this example, it may be assumed that transmission line 108 is capable of conveying two 64 kilobit per second data screens and additional data screens are received at node 110 in order to generate efficient 2 megabit transmission multiplexes.

A network, similar to network 103, could cover a large geographical area, possibly a whole country, with a total number of possible routes through the network being of the order of 100,000. Network 103, made up of nodes 110, 111, 112, 113,114, 115,116, 117 and 118 is a relatively small network and is shown as an example of network structure in general.

Communication paths between nodes convey a plurality of multiplexed channels where each channel within the path may be considered as a route portion, making up a constituent piece of the route as a whole. Similarly, transmission through the nodes may be considered as route portions, with each route portion used for a particular route requiring a finite level of network resource. Thus, the aforesaid nodes may be considered as being connected by route portions 120, 121, 122, 123, 124, 125, 126, 127, 128, 129, 130 and 131. Thus, node 110 may communicate with node 118, to allow customers 101 and 102 to communicate, via a path consisting of link 120, node 111, link 121, node 112, link 124, node 115, link 129 and node 118. Alternatively, a path may be provided by a link 122, node 113, link 125, node 114, link 128, node 117 and link 131 etc. Thus, for any particular communication nodes, a plurality of routes exist through the network and this plurality of all possible routes may be reduced to a set of practical routes from which a particular selection is made for a specific data transfer.

The network shown in FIG. 1, network 103 may be established as a switched network in which a physical communication channel is established for each particular transmission session. Alternatively, the network may operate as a packet switched network in which data generated by a source customer is transmitted as data packets, including destination headers, wherein said headers are read for each particular packet to determine a particular transmission path for that specific packet.

Figure 2:
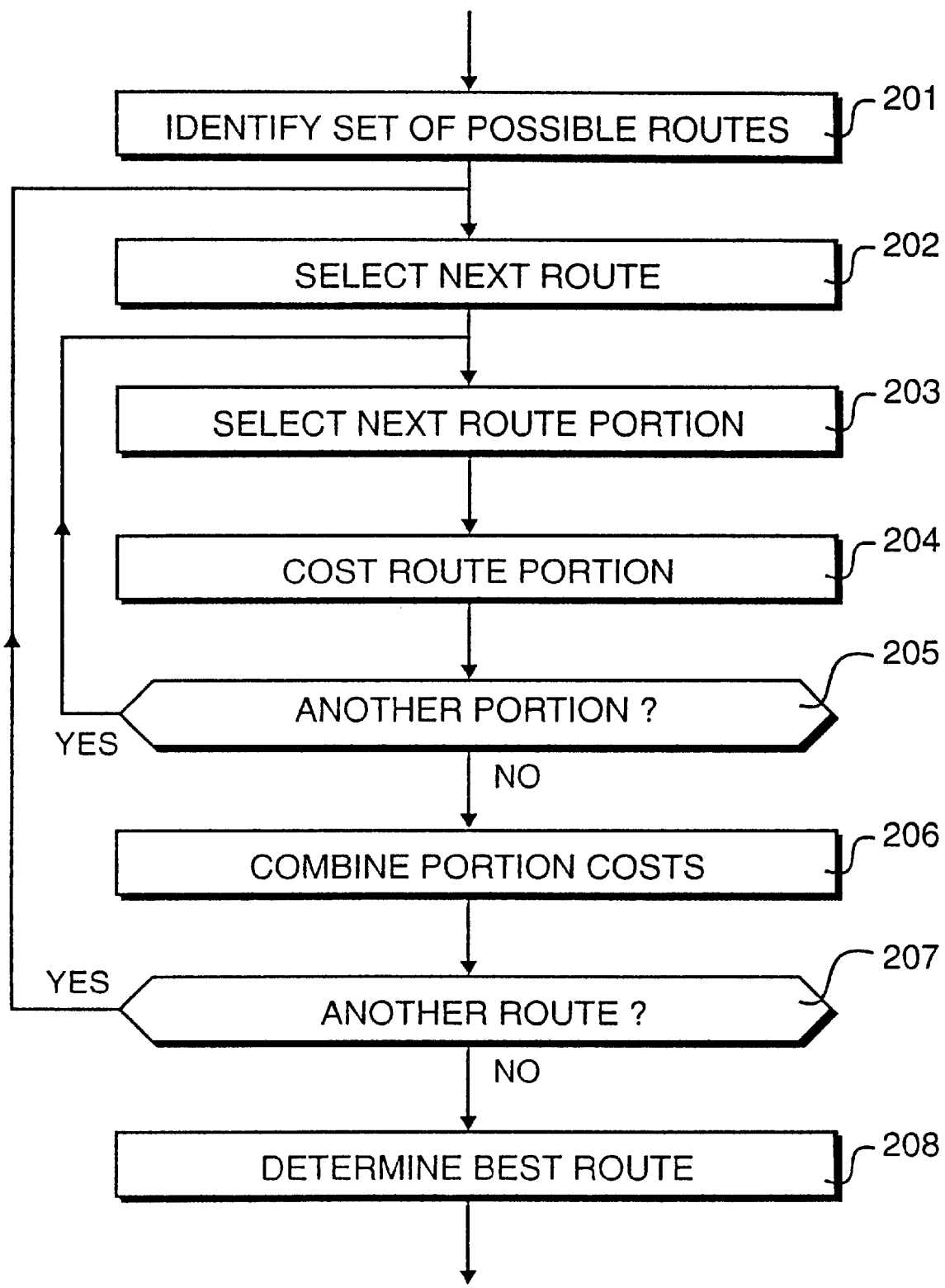
FIG. 2 illustrates procedures for selecting a particular route, including a process for costing route portions.

When the network is required to convey additional traffic, decisions must be made either once when the channel is established, on a per session basis as the channel is used, or on a per packet basis for each transmitted packet, to identify a preferred transmission route through the network. Selection is made by identifying a set of possible routes, calculating notional costs for each identified route and selecting the route which involves the least cost. A procedure for making a selection of this type is illustrated in FIG. 2.

At step 201 a set of possible routes is identified and at step 202 a particular route from said identified set is selected. At step 203 a route portion is selected and at step 204 a cost is determined for the particular portion selected at step 203.

At step 205 a question is asked as to whether another route portion is to be considered for the selected route and if answered in the affirmative control is returned to step 203. When the question asked at step 205 is answered in the negative, control is directed to step 206.

At step 206 the portion costs for a particular route determined at step 204 are combined to produce a total cost for the selected route. A question is then asked at step 207 as to whether another route is to be considered and when answered in the affirmative control is returned to step 202.

Eventually, all of the routes will have been considered resulting in the question asked at step 207 being answered in the negative and control being directed to step 208. At step 208 the combined portion costs calculated at step 206 for each of the identified routes are compared and from this comparison a best route is determined, based upon the route which has the lowest resulting overall cost.

Figure 3:
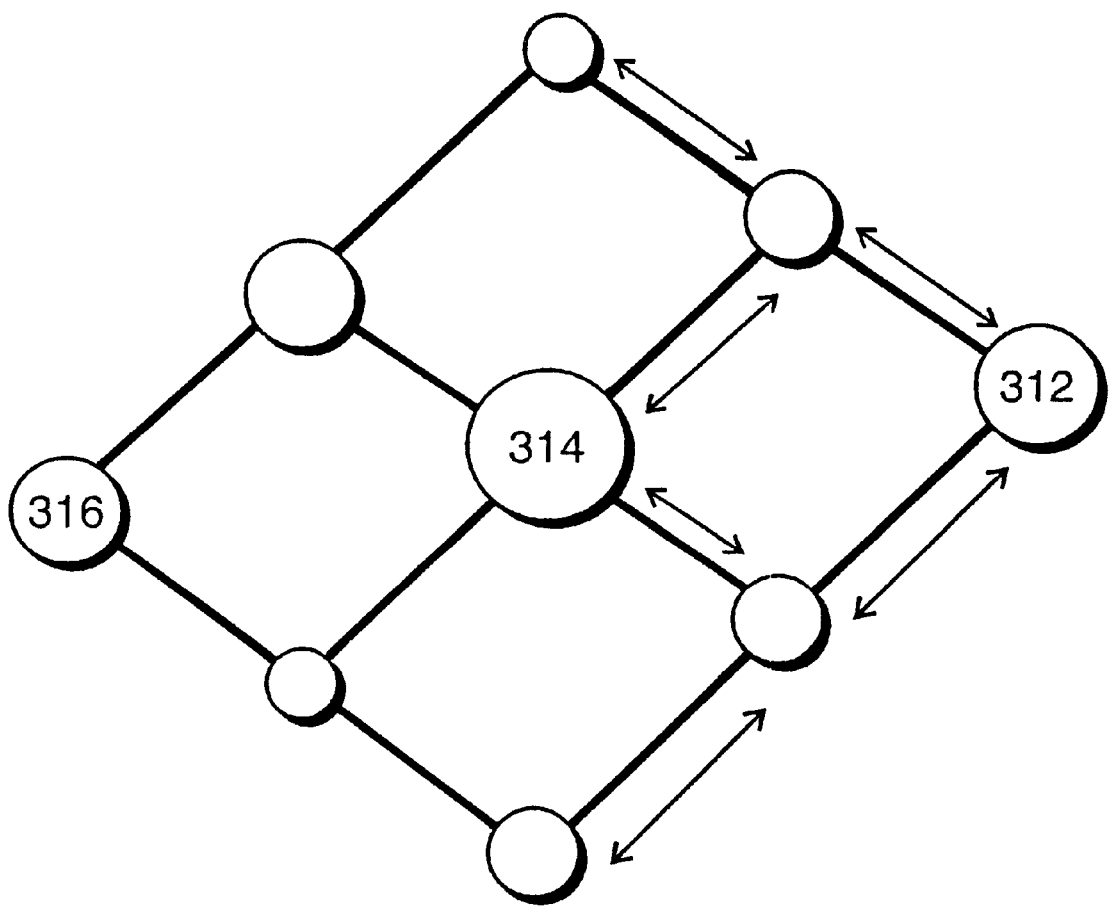
FIG. 3 illustrates the effect of particular nodes becoming saturated relative to other nodes.

The costing of routes will tend to be based upon static cost estimates, that is to say the marginal cost for placing an additional communication channel through a particular route portion will remain constant irrespective upon the total route loading. This will tend to result in some nodes conveying substantially more traffic than other nodes. This situation is illustrated in FIG. 3 which diagrammatically represents the network 103 as shown in FIG. 1. In the example shown in FIG. 3 the size of each node has been represented in proportion to the amount of traffic conveyed. Thus, as can be seen from FIG. 3, central node 314 will tend to convey more traffic than its surrounding nodes, such as the corner nodes 316 and 312. Such a situation will result in non-ideal utilization of nodal hardware which in turn may lead to overall system inefficiencies. Thus, it should be possible to analyze traffic requirements so as to optimize use of an existing network and also to optimize the upgrading of the network as increased demands are made for traffic capacity.

Figure 4:
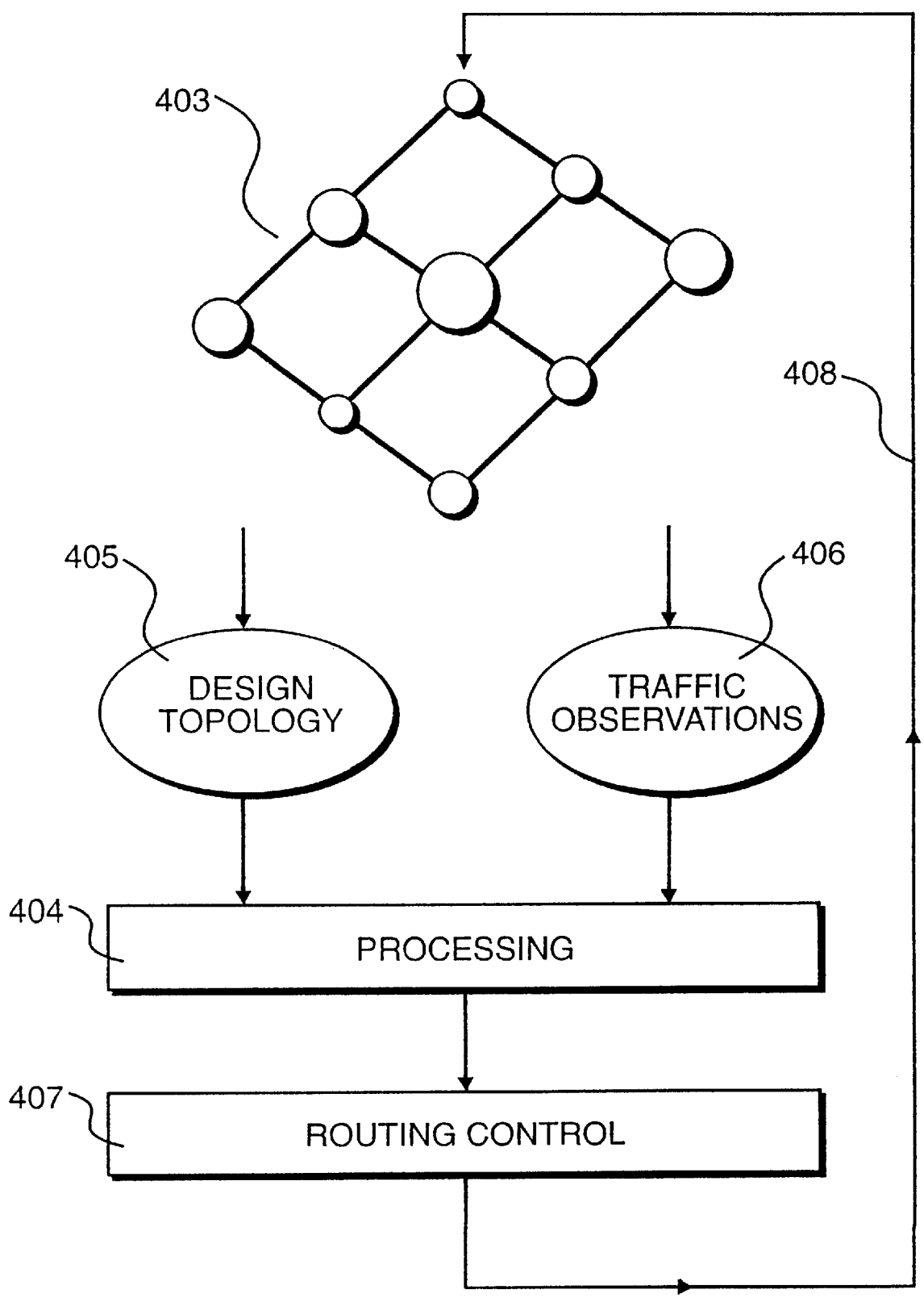
FIG. 4 illustrates an interactive approach towards network route selection optimization.

A procedure for optimizing the routing of new traffic through an existing network is illustrated in FIG. 4. The network shown in FIG. 1 is illustrated at 403. A processing system 404 is provided arranged to receive information 405 defining the network topology and information 406 relating to observations concerning levels of traffic present within the network.

The input information 405 and 406 is processed within processing environment 404 to produce routing control information to a routing control processor 407. The routing control processor 407 controls the routing of traffic through network 403, as illustrated by feedback loop 408. Thus, the effects of routing control will be reflected in new traffic observation data 406 which in turn will feed through into the processing environment 404. Similarly, if modifications are made to the overall network topology, such modifications will feed through to the network topology data 405.

In order for the processing environment 404 to supply meaningful information to the routing control processor 407, it is necessary for the processing environment 404 to be provided with a model as to how routing control should be affected in response to variations in communication traffic. Routing selection is made in accordance with the procedure shown in FIG. 2 in which route portions are costed. In order to introduce route selection on the basis of traffic levels, traffic level information is introduced by modifying route-portion costs in response to traffic density.

Figure 5A:
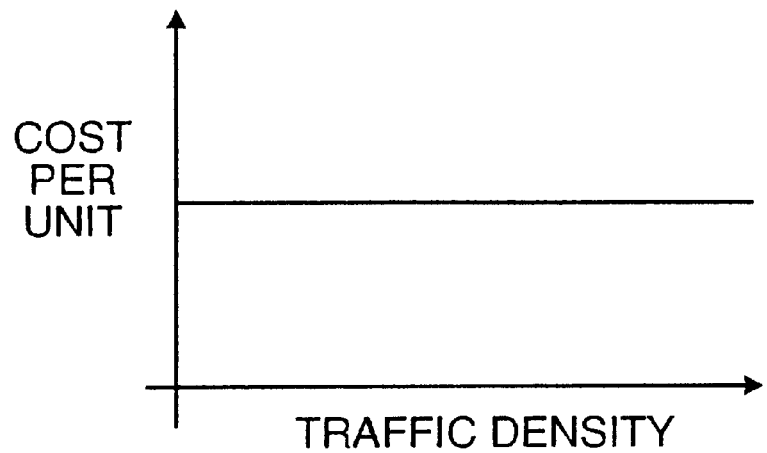
FIGS. 5A, 5B and 5C illustrate relationship models of unit cost shown against traffic density.

A first model is illustrated in FIG. 5A, in which routing efficiency is assumed to be totally independent of conveyed traffic. Thus, as traffic levels increase the cost per additional unit of traffic remains constant and no modifications are made to routing control in response to a measure of traffic density.

Figure 5B:
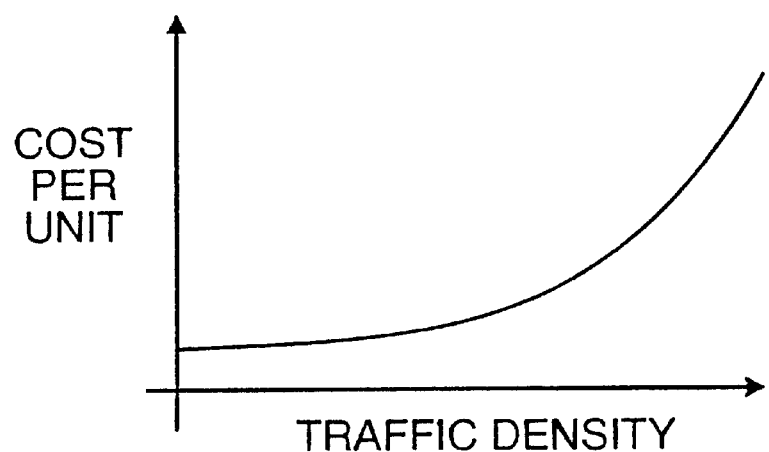

In reality, the model shown in FIG. 5A does not represent a realistic representation of the relationship between unit cost and traffic density. An alternative model is shown in FIG. 5B in which the unit cost is initially relatively constant for a significant period, whereafter the unit cost rises sharply as the portion under consideration starts to saturate. This model is used extensively in routing control systems and is primarily designed to ensure that no network portion becomes so overloaded that it may result in traffic being lost. However, the model assumes that while traffic density is relatively low, the unit cost of traffic transmission does not vary.

Figure 5C:
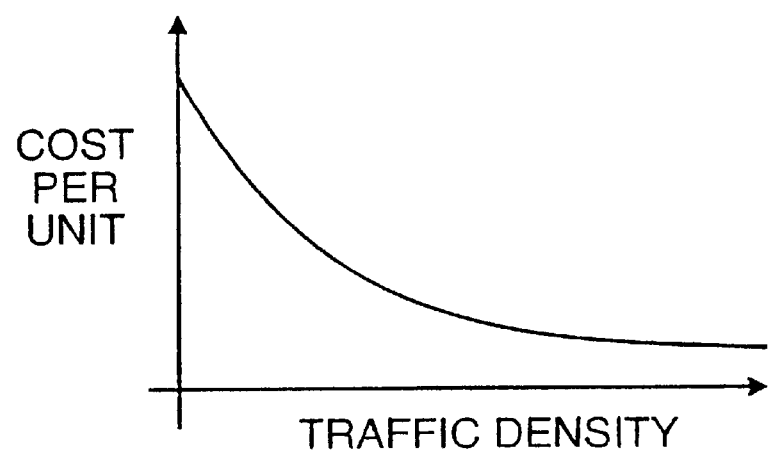

An alternative model is shown in FIG. 5C. In this model the cost per unit starts off being relatively high, representing a situation in which expensive network hardware has been installed for a relatively low level of communications traffic. Consequently, under such circumstances, the real cost per unit of traffic is relatively high, given that the transmission is occurring within a relatively inefficient environment.

The model shown in FIG. 5B will tend to be adopted when real-time decisions are being made to identify a particular route for a particular data transmission. Within dial-up environments, such a model may be particularly useful, particularly given the relatively high level of meshing within such environments, that is to say, many possible paths exist for connecting a source to a destination. A model shown in FIG. 5C is useful when considering how actual provision is to be made within a network in order to satisfy customer demand. This situation arises more in dedicated networks where the level of traffic flow tends to be relatively constant over significant periods of time and a plurality of customers are effectively sharing a resource in order to make maximum benefit of it. Under these circumstances, it is highly undesirable for a system resource to be conveying a relatively low level of traffic given that, in many situations, this resource could be used elsewhere to improve the overall perceived capacity of the network.

In the present embodiment a communications path may be established between terminals via a plurality of routes. Parameters for portions of a set of potential routes are processed to determine notional costs of using each of the said potential routes. An optimal level of traffic for a route portion is identified which, usually, will include a range of optimum levels. Outside these levels a parameter is adjusted in order to make the route portion more costly. Thus, the parameter is adjusted in order to make the route portion more costly if the traffic for that portion exceeds the optimal value or range of optimal values. This is consistent with the model shown in FIG. 5B which will endeavour to make the route portion appear more costly as traffic density increases in order to avoid the portion becoming saturated. However, in addition, a parameter, possibly the same parameter, is also adjusted to make the route portion appear more costly if the traffic for said portion falls below the optimum value or range of optimal values. This constraint is consistent with the model shown in FIG. 5C in which the unit cost becomes large if the traffic density is very small. With the costings adjusted in this way, a selection of a particular route is made with reference to route cost comparisons.

Figure 6A:
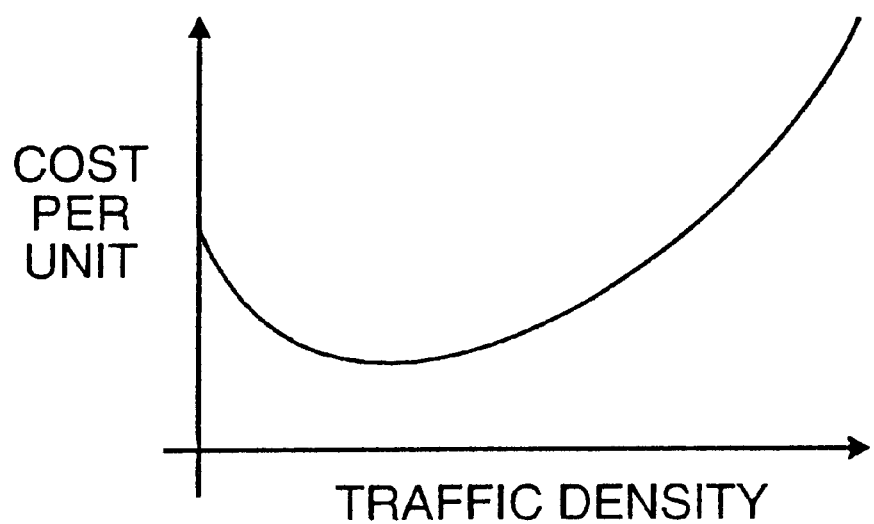
FIG. 6A shows a model adopted by the present invention of unit cost against traffic density and FIG. 6B illustrates a similar model for cumulative cost with respect to traffic density.

The resulting model is shown in FIG. 6A in which cost per unit of transmission is shown with respect to traffic density. As shown in FIG. 6A there is an optimum position where, for the optimal traffic density, the unit cost is minimized. Consequently, the unit cost is increased if traffic density is reduced or increased beyond the optimal value.

Figure 6B:
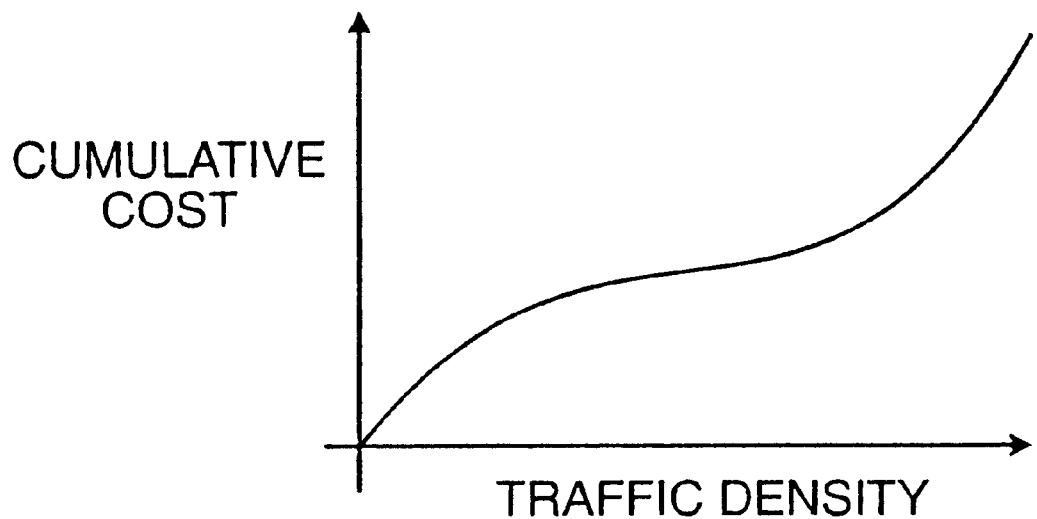

This relationship may be considered with reference to cumulative costs, as illustrated in FIG. 6B. A curve showing cumulative cost against traffic density will initially have a relatively steep gradient, derived from the relatively high unit cost at low traffic densities. As the traffic density increases, the rate of cost increase will decrease with the optimum value lying within the region of inflection where the cumulative cost is relatively flat. Thereafter, the cumulative cost will rise sharply again as the unit cost becomes large for high traffic densities.

The procedure for selecting routes in response to cumulative costs will result in traffic being directed such that the traffic density will be directed towards the flat portion of the curve shown in FIG. 6B. In practice, this will result in a concentration of traffic on to efficient links, with inefficient links being provided with additional capacity as they tend to start saturating and with inefficient links conveying low traffic densities being removed from the network, provided that an alternative route can be identified, as would normally be the case. Thus, the network will tend to evolve in response to customer demands with optimal efficient use being made of the network investment.

The example shown in FIG. 6B represents a moderate relationship between cumulative costs and traffic density. Under some circumstances the shape of the curve shown in FIG. 6B will look different, as illustrated in FIGS. 7A and 7B.

Figure 7A:
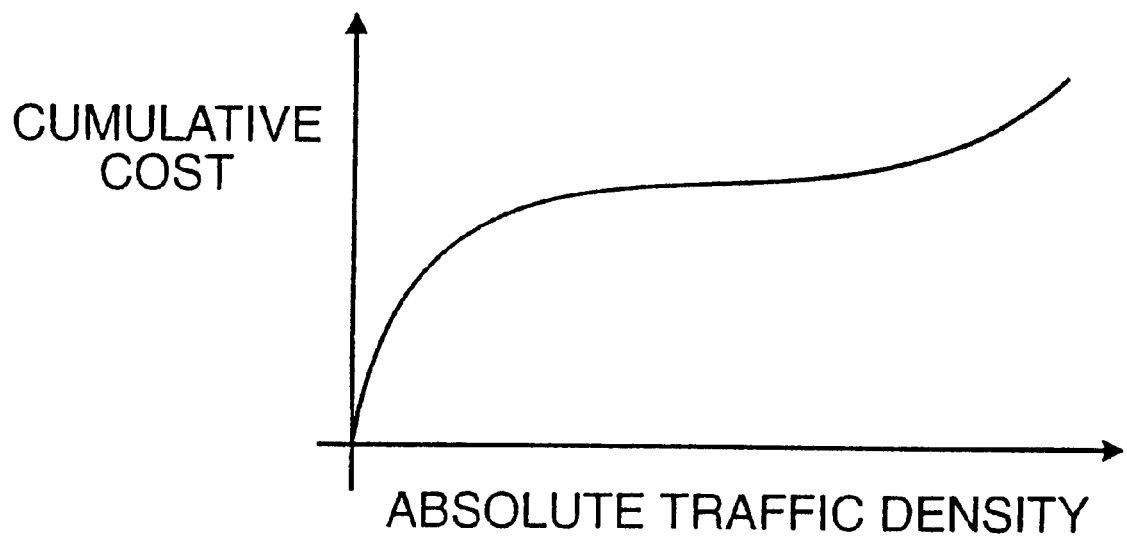
FIGS. 7A and 7B illustrate model extremes for the relationship illustrated in FIG. 6B.

In FIG. 7A the emphasis has been placed on high costs for low traffic densities. Consequently, the cumulative cost rises sharply and then tends to reach a plateau representing a relatively large optimal range. In FIG. 7B the dominant effect is due to high costs for high traffic densities. At low densities the cumulative cost rises moderately up towards an optimal range, whereafter, beyond said range, the cumulative cost rises relatively sharply.

Figure 7B:
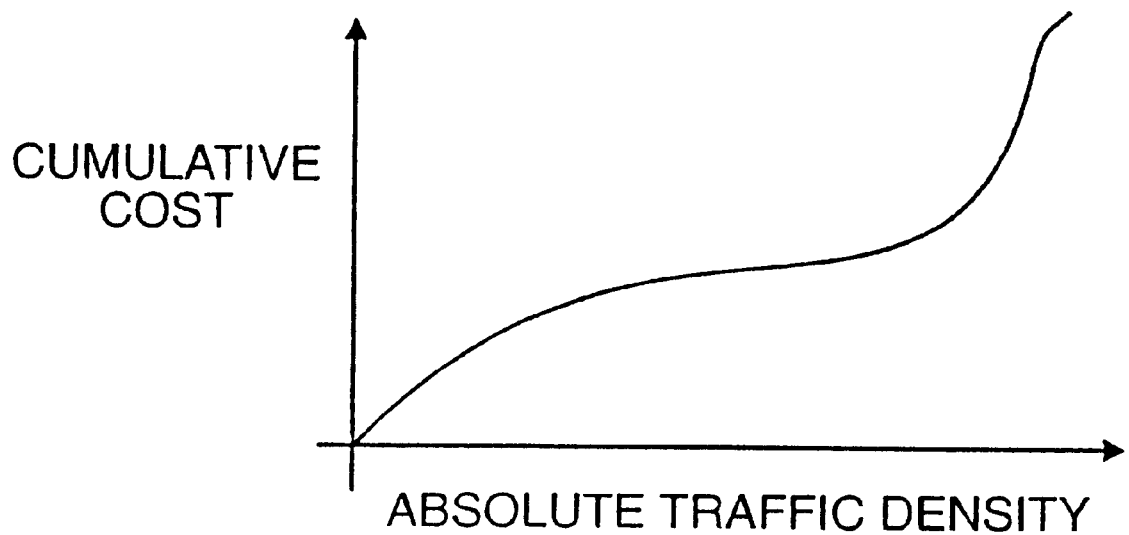

The adoption of a preferred model, such as the model illustrated in FIGS. 6B, 7A and 7B will depend upon dynamic constraints in addition to static topological constraints. Thus, the model will change as traffic demand changes for the network as a whole. Thus, an optimal model will change whether absolute traffic flows are being considered for a portion or whether traffic through this portion is being considered relatively to traffic elsewhere. It is therefore possible to provide a plurality of models such that appropriate model data may be selected in response to identified conditions. The model itself may be calculated, possibly as a polynomial spline or alternatively values may be derived from a look-up table. In a further level of sophistication, it is possible for intermediate responses to be generated by interpolating between precalculated or prestored model responses.

Figure 8:
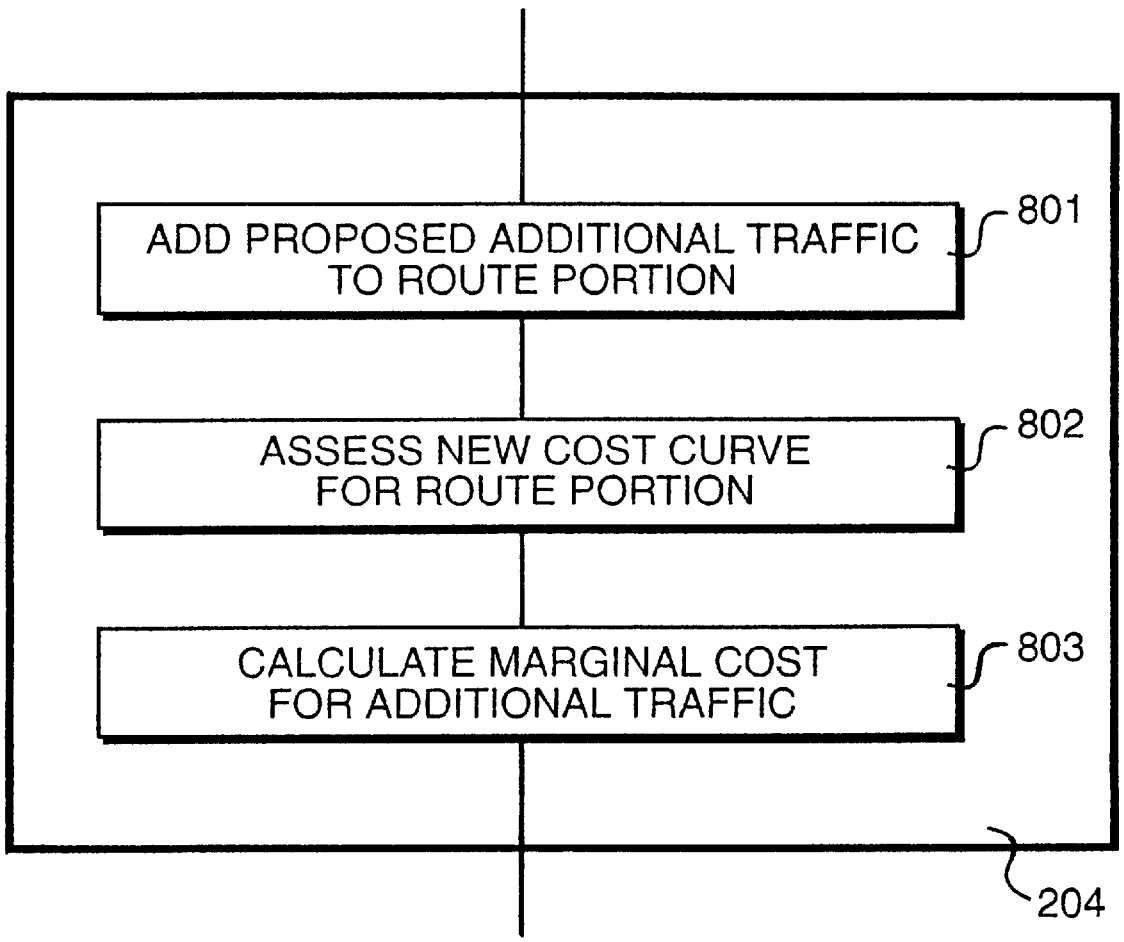
FIG. 8 details the route-portion costing-process identified in FIG. 2, as embodied by the present invention.

Process 204 for costing a particular route portion is detailed in FIG. 8. At step 801 a value representing the required additional traffic is added to a value representing the amount of traffic presently being conveyed by the portion under consideration. At step 802 an assessment is made as to the particular cost curve required in order to obtain an optimal measure of the marginal cost. As previously stated, this may consist of selecting data or interpolating between calculated or selected data.

At step 803 the marginal cost for the proposed additional traffic is calculated, with reference to the response model selected at step 802.

So far, measurements and costs have been referred to in the abstract and it will be appreciated that many factors may be involved when determining an actual cost, so that costs may be compared meaningfully between different route portions. Cost is often measured in terms of route length, which provides a highly representative measurement, particularly if a similar technology is being used for the transmission of data over each of the route portions. By costing route portions in terms of their lengths, it is then possible to effectively modify notional lengths in order to increase or decrease the cost of using that route. It is then possible to implement known procedures for identifying a best route based on the shortest path between nodes. Such an approach may be particularly attractive in many environments, whereby the need for finding all possible routes may be avoided, thereby improving the requirement for processing capacity.

It can be seen that the new procedure has two significant benefits. Firstly, it allows an optimized route to be selected for new traffic to be conveyed within an existing network. Furthermore, it also allows information to be derived as to where new network investment should be made in terms of providing additional transmission capacity for particular sections of the network.

I claim:

1. A method for selecting one of a plurality of possible routes through a communications network from a first node to a second node, said method comprising the steps of:

defining a relationship between a range of costs for routes and the traffic density for routes, said relationship being represented by a curve having at least one point of inflection;

monitoring and using traffic density for each of said plurality of possible routes to establish the cost of each said possible route in accordance with said relationship; and selecting one of said plurality of possible routes in dependence on the cost of each said possible route as established by said relationship.

2. A method as in claim 1 in which the magnitude of the gradient of a portion of the curve for traffic density values within a first range is less than that for a second range of traffic density values.

3. A method as in claim 2 in which the first range of traffic density values represent optimum traffic density values, said relationship being substantially linear within said first range.

4. A method as in claim 1 wherein in said monitoring step, if a possible route connects said first node to said second node via one or more other nodes using a plurality of sub-routes, a cost for each said sub-route is established.

5. A method as in claim 4 wherein in said monitoring step the costs of sub-routes of a given possible route are combined to give the cost for said possible route.

6. A method as in claim 1 wherein in said monitoring step the cost of a given possible route is established with reference to the effective length of the respective sub-routes.

7. A method as in claim 1 wherein said plurality of possible routes is constituted by a subset chosen from a set of possible routes from said first node to said second node.

8. Apparatus for selecting one of a plurality of possible routes through a communications network from a first node to a second node, said apparatus comprising:

means for defining a relationship between a range of costs for routes and the traffic density for routes, said relationship being represented by a curve having at least one point of inflection;

means for monitoring and using traffic density for each of said plurality of possible routes to establish the cost of each said possible route in accordance with said relationship; and means for selecting one of said plurality of possible routes in dependence on the cost of each said possible route as established by said relationship.

9. Apparatus as in claim 8 in which the magnitude of the gradient of a portion of the curve for traffic density values within a first range is less than that for a second range of traffic density values.

10. Apparatus as in claim 9 in which the first range of traffic density values represent optimum traffic density values, said relationship being substantially linear within said first range.

11. Apparatus as in claim 8 wherein said monitoring means is operable, if a possible route connects said first node to said second node via one or more other nodes using a plurality of sub-routes, to establish a cost for each said sub-route.

12. Apparatus as in claim 11 wherein said monitoring means is operable to combine the costs of sub-routes of a given possible route to give the cost for said possible route.

13. Apparatus as in claim 8 wherein said monitoring means is operable to establish the cost of a given possible route with reference to the effective length of respective sub-routes.

14. Apparatus as in claim 8 wherein said plurality of possible routes is constituted by a subset chosen from a set of possible routes from said first node to said second node.

15. A method for calculating costs of each of a plurality of possible routes through a communications network from a first node to a second node, said method comprising the steps of:

defining a relationship between a range of costs for routes and the traffic density for routes, said relationship being represented by a curve having at least one point of inflection; and using the traffic density for each of said plurality of possible routes to establish the cost of each said possible route in accordance with said relationship.

16. Apparatus for calculating costs of each of a plurality of possible routes through a communications network from a first node to a second node, said apparatus comprising:

means for defining a relationship between a range of costs for routes and the traffic density for routes, said relationship being represented by a curve having at least one point of inflection; and means for using the traffic density for each of said plurality of possible routes to establish the cost of each said possible route in accordance with said defining means.

* * * * *